US012717597B1

(12) United States Patent
Garg et al.

(10) Patent No.: US 12,717,597 B1
(45) Date of Patent: Aug. 25, 2026

(54) CUSTOM INTERACTIVE ELEMENT IDENTIFICATION

(71) Applicant: BrowserStack Limited, Dublin (IE)

(72) Inventors: Sajal Garg, Delhi (IN); Jimesh Mayank Chokshi, Mumbai (IN)

(73) Assignee: BrowserStack Limited, Dublin (IE)

( * ) Notice: Subject to any disclaimer, the term of this patent is extended or adjusted under 35 U.S.C. 154(b) by 0 days.

(21) Appl. No.: 19/320,116

(22) Filed: Sep. 5, 2025

(51) Int. Cl.
*G06F 9/451* (2018.01)
*G06F 9/54* (2006.01)
*G06F 16/958* (2019.01)

(52) U.S. Cl.
CPC .............. *G06F 9/451* (2018.02); *G06F 9/542* (2013.01); *G06F 16/958* (2019.01)

(58) Field of Classification Search
CPC ......... G06F 9/451; G06F 9/542; G06F 16/958
USPC .......................................................... 717/124
See application file for complete search history.

(56) References Cited

U.S. PATENT DOCUMENTS 5,692,142 A * 11/1997 Craycroft ................ G06F 9/451 715/744
7,448,042 B1 * 11/2008 Engber ................... G06F 9/451 719/310
8,196,104 B2 * 6/2012 Cohrs ................. G06F 11/3672 717/124
2004/0125130 A1 * 7/2004 Flamini ................. G06F 16/958 707/E17.116
2015/0356302 A1 * 12/2015 Simpson ............... G06F 21/577 726/25
2016/0140338 A1 * 5/2016 Walters ................... G06F 21/31 726/22
2016/0261475 A1 * 9/2016 Jadhav .................... G06F 16/95
2017/0249287 A1 * 8/2017 Thayer .................. G06F 40/143
2021/0232755 A1 * 7/2021 Jadhav .................. G06Q 10/20

OTHER PUBLICATIONS

Kane, David, and Nora Hegarty. "New web site, new opportunities: Enforcing standards compliance within a content management system." Library hi tech 25.2 (2007): pp. 276-287. (Year: 2007).*
Chisholm, Wendy, Gregg Vanderheiden, and Ian Jacobs. "Web content accessibility guidelines 1.0." Interactions 8.4 (2001): pp. 35-54. (Year: 2001).*
Dimyadi, Johannes, Pieter Pauwels, and Robert Amor. "Modelling and accessing regulatory knowledge for computer-assisted compliance audit." Journal of information technology in construction 21 (2016): pp. 317-336. (Year: 2016).*

(Continued)

*Primary Examiner* — Satish Rampuria
(74) *Attorney, Agent, or Firm* — Cognition IP, P.C.; Edward Steakley; Saleh Kaihani

(57) ABSTRACT

An accessibility test engine can receive the document object model of a webpage and analyze the webpage for compliance with a set of accessibility rules. The test engine analyzes the compliance of a webpage element with accessibility rules in part by identifying the type of element. The test engine can include a module for detecting custom interactive elements on a webpage. When several elements in a family tree of an element are custom interactive elements, a representative custom interactive element is selected and used for accessibility testing.

20 Claims, 3 Drawing Sheets

(56) References Cited

OTHER PUBLICATIONS

Ferrari, Claire, and Amy Hurst. "Accessible web development: Opportunities to improve the education and practice of web development with a screen reader." ACM Transactions on Accessible Computing (TACCESS) 14.2 (2021):pp. 1-32. (Year: 2021).*

Trewin, Shari, et al. "Accessibility challenges and tool features: an IBM Web developer perspective." Proceedings of the 2010 international cross disciplinary conference on web accessibility (W4A). 2010.pp. 1-10. (Year: 2010).*

Munn, Zachary, et al. "The development of a critical appraisal tool for use in systematic reviews addressing questions of prevalence." International journal of health policy and management 3.3 (2014): pp. 123-128. (Year: 2014).*

* cited by examiner

CUSTOM INTERACTIVE ELEMENT IDENTIFICATION

BACKGROUND

Field

This invention relates generally to website development tools, and more particularly to tools directed to developing accessibility features of a website.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software developers have a strong interest in making their products and services accessible to as many segments of the population as possible. To that end, some developer teams dedicate their efforts to testing and debugging software accessibility issues. Some use tools that assess the compliance of software relative to a set of accessibility rules. Many of these tools rely on having to correctly identify the type and nature of the software element, particularly in the area of user interfaces, so they can correctly apply the relevant accessibility rules to the element and assess compliance. Consequently, there is a need for systems and methods that can assist and automate in robustly identifying software elements and applying correct accessibility rules to those elements.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1:
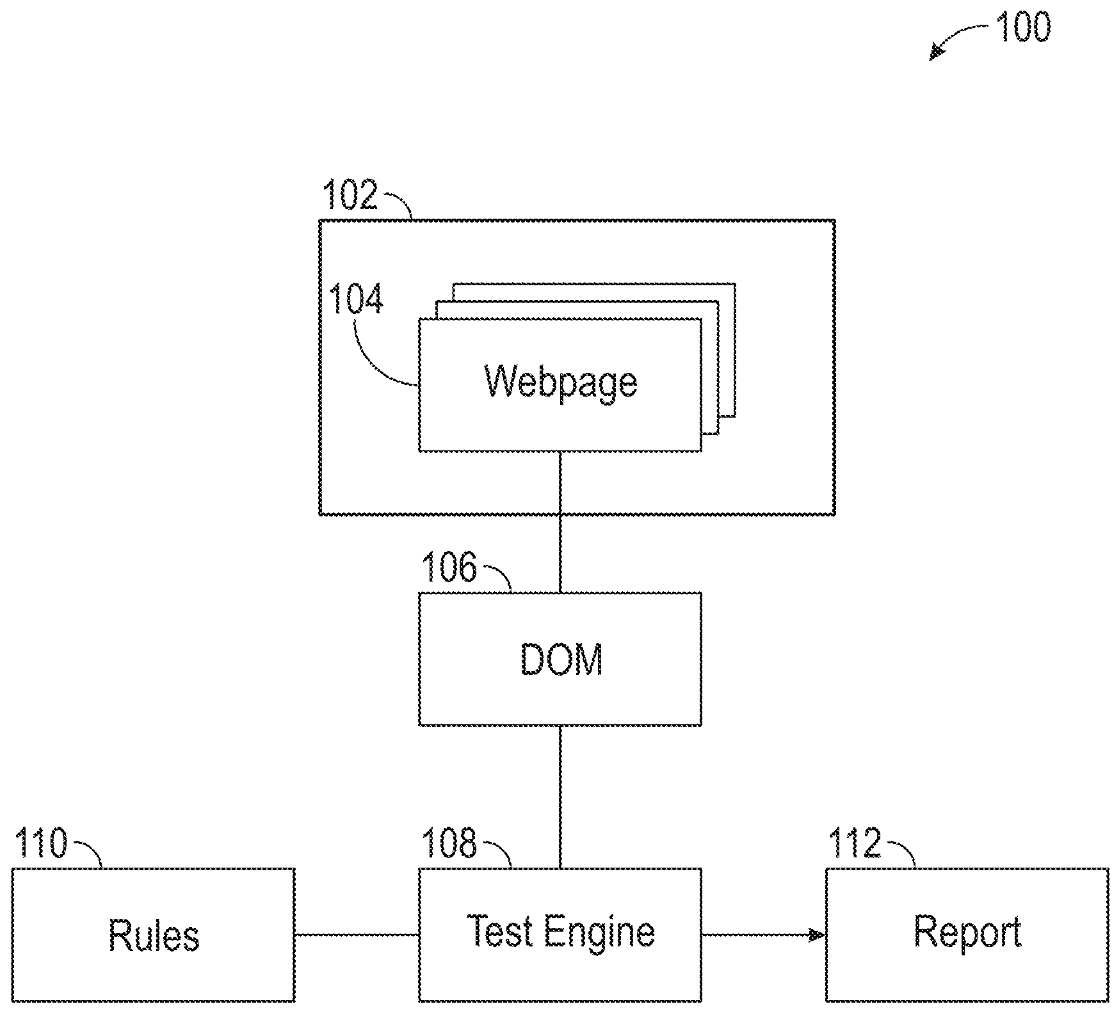
FIG. 1 illustrates a block diagram of an environment of an accessibility test engine, deployed in relation to a website.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A software development platform can include tools for testing and developing software with respect to accessibility features to make the software more accessible to all segments of the population. As such, the software development platform can include accessibility testing and accessibility test engines, which can accept software, for example, a webpage, as input, and generate an accessibility report. The report can include an identification of whether or not various elements of the software, for example in the user interface (UI) features, satisfy accessibility requirements. In some cases, accessibility requirements are directed to making the software compliant with screen readers and other accessibility technologies to enable accurate interfacing with accessibility technologies, such as screen readers and others. While the embodiments are described in relation to testing and developing accessibility features of software, the embodiments are also applicable to testing and development of any set of features for which, there can be a set of rules and a corresponding test engine. In other words, the context of accessibility in the described embodiments are provided as an example application of the described embodiments.

FIG. 1 illustrates a block diagram 100 of an environment of an accessibility test engine 108, deployed in relation to a website 102. The website 102 can include multiple webpages 104. Webpages 104 can have associated document object models (DOMs) 106. The Document Object Model (DOM) connects webpages to scripts or programming languages by representing the structure of a document—such as the hypertext markup language (HTML) representing a webpage—in memory. Usually it refers to JavaScript, even though modeling HTML, SVG, or XML documents as objects are not part of the core JavaScript language. The DOM represents a document with a logical tree. The test engine 108 can test a webpage for compliance with a set of rules 110, using the DOMs 106 of the webpages 104, and can generate a report 112 for the webpages 104 and/or the website 102.

The operations of the test engine 108 is in part based on detecting what type of webpage element exists on a webpage 104. The type of element can indicate which rules from the set of rules 110, the test engine 108 should apply to a particular webpage element.

Accessibility developers are in part interested in increasing keyboard accessibility and screen reader friendliness of various user interface elements of a software, such as a webpage. Accessibility tools can in some implementations rely on allowing a user access and interaction with their user interface via a combination of keyboard and screen readers. For example, an accessible user interface can allow a user to use the tab key on the user keyboard to tab through various menu options User interface elements of a software can include metadata, which can, in turn, provide insight into whether a user interface element complies with accessibility rules. Compliant metadata includes various characteristics. For example, it can show the user interface element has a descriptive element label name, corresponding to the function of the element, and other characteristics. Furthermore, since screen readers can rely on user interface metadata to function correctly, mere presence or lack of presence of metadata for a user interface element can be indicative of the compliance of the user interface element. Consequently, the user interface metadata can be analyzed to determine whether the user interface is accessibility compliant.

Various types of user interface elements can be analyzed under their relevant and corresponding accessibility rules. The test engine 108 can include various modules for detecting and flagging various types of elements, so the corresponding rules 110 can be applied. While the embodiments are described in relation to analyzing accessibility features, and applying accessibility rules, other rules can also be applied once a type of element is determined. In other words, the application of the described technology is not limited only to determining accessibility compliance.

Among various user interface elements, which can be of interest to software developers and accessibility developers, is user interactive elements. User interactive elements are those software elements, for example user interface elements, with which the user can interact by "clicking," "hovering," "tabbing through." User interactive elements can include standard user interactive elements and custom user interactive elements. Standard user interactive elements can be provided in and by the standard library of a programming language, such as those provided in the hypertext markup language (HTML). For example, some HTML elements are by default user interactive elements. Examples include elements, having labels such as "buttons," and "input," "a [href]," and others. When an interpreter of a language renders these user elements, for example, when a browser implements a standard user interactive HTML element, the interpreter or the browser treats the elements as automatic. The treatment can include automatically allocating to the element accessibility features. For example, tabbing over the element when the keyboard key "tab" is pressed. The test engine 108 may have separate rules 110 for assessing the accessibility compliance of the standard user interactive elements.

For modern implementation of software, for example websites, the use of the standard user interactive elements can create an outdated and unpolished user interface look, as the standard user interactive elements are much less sophisticated, visually and functionally compared to custom user interactive elements. Consequently, developers of modern programs make extensive use of custom user interactive elements. In the area of website development, the developers may implement an interactive user interface element with HTML element, such as "div," "span," and others. Furthermore, the structures of a modern custom user interactive element can be complex, nested and/or otherwise extensive. For example, while a standard user interactive element can be implemented with a few lines of code, a custom user interactive element can be implemented with more extensive volume of code in comparison.

Table (1) illustrates example accessibility rules which can be used to analyze accessibility compliance of a user interactive element.

TABLE (1)

| Rule | Description |
|---|---|
| Role required | Role of an interactive element is not missing or incorrect |
| Role-required carousel | Role of an interactive carousel is not missing or incorrect |
| Role required menu | Role of the interactive menu element is not missing or incorrect |
| Accessible name | Interactive element has a name, which is accessible by assistive technologies (e.g., screen reader) |
| Accessible name carousel | Interactive carousel element(s) has/have name(s), which are accessible by assistive technologies. |
| Keyboard interactive | Interactive element is focusable to make it keyboard accessible |
| Keyboard menu | Menu element is focusable to make it keyboard accessible |

Custom user interactive elements can be implemented in an unlimited number of ways, where each developer team may have their own preferred way of implementing their custom user interactive elements. Nevertheless, for the purpose of determining and/or assessing the accessibility compliance of software, user interactive elements, including the custom user interactive elements should also be analyzed to the extent possible.

The varying nature of the custom user interactive elements makes them more difficult to detect with a single algorithm. Some characteristics can be indicative of a custom user interactive element, which can be exploited to develop a custom user interactive element detector in the test engine 108. For example, some user interactive elements are "focusable elements." Focusable elements are elements that when rendered by the browser, respond to keyboard shortcuts, keys or key combinations, by visually distinguishing the element to the user. For example, a browser renders a focusable element on a webpage by 1displaying a border, or underlining the element when the user presses the tab key. In many modern websites, options to navigate various webpages of a website, are implemented with focusable elements.

Figure 2:
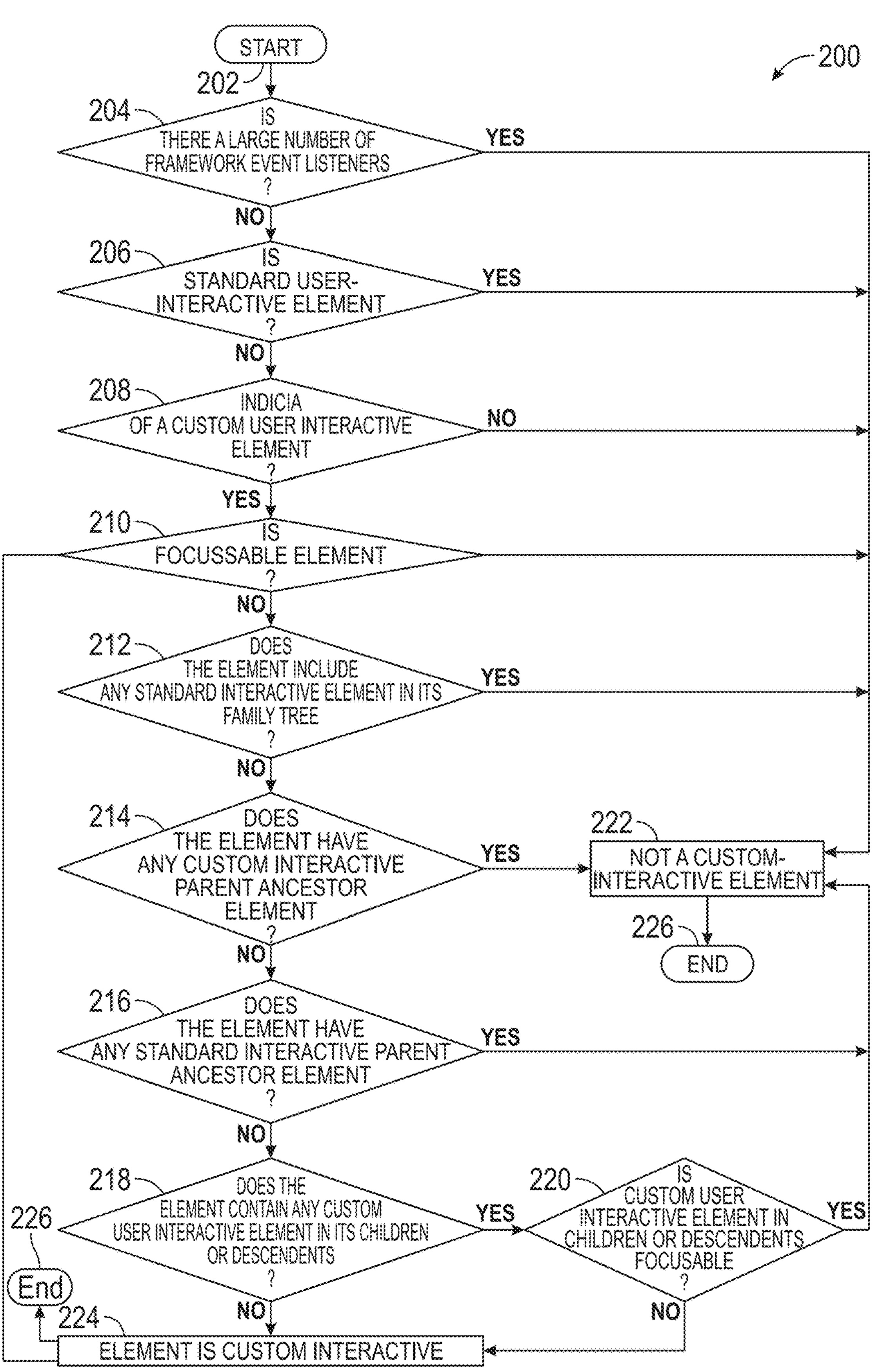
FIG. 2 illustrates a flowchart of a method of determining a custom interactive element.

FIG. 2 illustrates a flowchart of a method 200 of determining a custom interactive element. The method 200 can be implemented in a custom interactive element detector in the test engine 108. The method 200 can operate on a webpage element, and be repeated with respect to the other elements of a webpage. The execution of the method 200 with respect to various webpage elements can also be parallelized, where two or more parallel processes, each running the method 200 with respect to a different webpage element can be executed. The method starts at step 202 by receiving a webpage element as input. The element can be any element in a structure of a webpage. The element can have children elements, be a parent, and/or be a child or descendent. As an example, a menu submenu webpage element can be a child of a parent menu element, and can have dropdown children submenus. Step 204 includes determining whether the element contains "framework listeners." Framework in this context includes standard libraries, modules and tools provided by a programming language used to code the website. Typically such libraries provide a relatively large number of event listeners on various elements by default. The developer, instead of programming the webpage from scratch takes advantage of predefined framework elements and customizes them, according to the developer's use case. "Event listeners" are detectors that indicate whether the element they are listening to has encountered a corresponding event. Example modern event listeners include click event listeners, drag and drop event listeners, hover event listeners, and many more. Event listeners in their default form as provided by a framework only provide an indication of an event. The developer, depending on their use case, may or may not implement a corresponding code to be executed when an indication of an event is received from an event listener. In a typical website program, not all default event listeners have subsequent logic or code. In other words, the developer may not implement logic for many of the default event listeners. Nevertheless, custom interactive elements have at least some event listeners implemented to provide their interactive functionality. The presence of a relatively large number of framework event listeners can be an indication that the element is not a custom element. The number of event listeners can be compared against a selected threshold of default event listeners. When the number of framework listeners exceeds the selected threshold, the method can move to step 222, where the element is labeled as "not a custom element." The method ends at step 226 with respect to the input element. The threshold of default event listeners can be empirically determined by analyzing hundreds or thousands of websites. For example, in some embodiments, the selected threshold can be ten or more framework listeners can indicate that the element is not a custom interactive element.

Step 206 includes determining whether the element is a standard user interactive element. Standard user interactive element are those elements provided by the programming language or framework in which the webpage is written, where the element by default is a user interactive element. In some embodiments, whether the element is a standard user interactive element can be determined in part and in some cases based on the label of the element. For example, an HTML button element, labeled as a "button," is a standard user interactive element. The method 200 can filter out the standard user interactive elements for a variety of reasons. For example, the test engine 108 may have a different set of accessibility rules 111 to apply to the standard user interactive elements, compared to custom user interactive elements. Alternatively, or in addition, some standard user interactive elements may not need any accessibility testing as the framework by default provides adequate accessibility coverage. If, at step 206, it is determined that the element is a standard user interactive element, the process moves to step 222, where the element is labeled as "not a custom interactive element," and the method ends at step 226 with respect to that element.

If the element is not a standard user interactive element, the method moves to step 208, where it is determined whether one or more indicia of a custom user interactive element are present. The indicia of custom interactivity implementation can depend on the framework and implementation and the context of the software to which the method 200 is applied. In the case of HTML and other webpage related codes, additional indicia of custom interactivity can include presence of a "click event listener," with a follow-up or subsequent code. For example, when an element includes a "click event listener," and response code for when the event listener detects a click event can indicate that the element is potentially a custom user interactive element.

Step 208 may include testing for more than one indication of custom user interactivity, where a single indication by itself may not necessarily be sufficient to confidently conclude that the element is a custom user interactive elements; rather, the presence of the one or more indicia can indicate a potential custom user interactive element. Additional steps in method 200 can further examine and increase the reliability of positive detection of a custom user interactive element.

Another indication of a custom user interactive element is whether the element, in response to an event listener, performs an action in the user interface generated by or related to the element. For example, when an element, in response to a "hover" event detection, changes the shape of a mouse cursor, for example, changes an arrow mouse pointer to a hand pointer pointing to the element, such user interface modifications in response to the event listener output can be a strong indication that the element is a custom user interactive element. In some cases, the change in visual representation or user interface (UI) output of the element can be changing the mouse pointer (e.g. an arrow) to a "cursor pointer" indication. When one or more indicia of a custom user interactive element are not present, the element is likely not custom interactive, and the method moves to step 222, where the element is labeled as "not a custom interactive element," and the method mends at step 226. On the other hand, if the indicia are present, the method moves to step 210.

Step 210 includes determining whether the element is focusable. If yes, the method moves to step 224, where the element is labeled as custom interactive, and the method ends at step 226. If the element is not focusable, the method moves to step 212. Step 212 includes determining whether the element includes any standard user interactive elements in one of its children, children of children or one of its ancestors. In other words, if the element is part of a hierarchy or nested element structure, step 212 includes determining whether any element in the hierarchy of element includes a standard user interactive element. Presence of a standard user interactive element in the hierarchy or family tree of the element can indicate that the element is not a custom interactive element. If yes, the method moves to step 222, where the element is labeled as "not a custom interactive element," and the method ends at step 226, with respect to that element. If no element in the hierarchy or family tree of the element is a standard interactive element, the element is potentially custom user interactive element, and the method moves to step 214.

Step 214 includes determining whether the element has any custom interactive parent or ancestor element. If another element in the parent ancestors, for example an immediate parent has a custom user interactive element, it can indicate that the method has already detected or will detect that the parent or ancestor is a custom user interactive element, and that the method does not need to consider the current element any further. The method 200, in some embodiments, analyzes each HTML element on a webpage in order, as the element appears in the webpage code, or with parallelization, and a hierarchy with some elements, being custom interactive elements may be handled in a different execution of the method 200 with respect to those elements. If at step 214, it is determined that a parent ancestor element in the family tree of the element is a custom interactive element, the method moves to step 222, labels the current element as "not a custom interactive element," and the method ends at step 226, with respect to the current input element. When no other element in the family tree of the current input element is determined to be a custom interactive element, the method moves to step 216.

Step 216 includes determining whether the element has any standard interactive parent ancestor element. If yes, the element is likely not a custom interactive element, and the method moves to step 222, labels the element as "not a custom interactive element," ending the method at step 226 with respect to that element. If no parent ancestor of the element is a standard user interactive element, the method moves to step 218.

Step 218 includes determining whether the element has any child or nested descendent custom interactive element in its hierarchy. If no, the element is likely a custom interactive element, and the method labels the element as such in step 224, and the method ends at step 226 with respect to that element. If at step 218, it is determined that a child or nested descendent element of the current element is a custom interactive element, the method moves to step 220. Step 220 includes determining whether the custom user element in the child or nested descendent element determined at step 218 is a focusable element. If yes, the current element is likely not a custom interactive element, and likely the child or the nested descendent element, of the element analyzed at step 218 is a custom interactive element. The method moves to step 222, labels the current element "not a custom interactive element," and the method ends at step 226 with respect to the current element. If the custom interactive element determined at step 220 is not focusable, the method moves to step 224, and the current element is labeled as a custom interactive element. The method ends at step 226. In some embodiments, the determination of whether a child or a nested descendent element is a user interactive element can be analyzed using the indica outlined above with respect to step 208.

The steps of the method 200 are not necessarily and only concerned with detecting custom interactive elements in all analyzed elements; rather, they can "label" a representative element in a hierarchy or family tree of elements as "the representative interactive element," for the purpose of accessibility testing. While detecting user-interactive custom element, multiple elements in parent-child hierarchy can be detected to have custom interactivity, flagging all of them can lead to duplicate/unnecessary noise for the test engine. In such cases, only a representative interactive element can be flagged for testing. In some embodiments, a selected representative custom interactive element can be alternatively referred to as the most prominent custom interactive element. However, detecting or selecting the representative custom user interactive element, can depend on website design and can be very contextual in nature. Approaches to selecting a representative custom user interactive element, within a family tree or hierarchy can include selecting the outer-most parent element for a hierarchical element, or selecting the inner-most parent element as the representative custom interactive element for the hierarchical element.

As an example of a hierarchical element, implemented in HTML, a custom interactive element "button" can be implemented with "+create" button as a "div," where inside the "div," there is a "span," and the inner span can function as and assume the role of the button. In some implementations, the inner span can have children of its own. In such scenarios, multiple permutations and combinations of selecting a representative custom interactive element is possible. A method of selecting an effective custom interactive element can be determined by analyzing a plurality of websites (e.g., hundreds, thousands, or millions). A well-selected representative custom interactive element is that element, which can provide a suitable source of metadata to an accessibility tool, such as a screen reader. Accessibility tools, such as screen readers sometimes when encountering nested hierarchical elements, mechanically pull metadata from any element within the hierarchy (e.g., children, parents, etc.). This can cause the wrong metadata, inaccurate, or irrelevant metadata forming the basis of the output of the accessibility tool. The test engine 108 can select and test a representative custom interactive element that is most likely to be the basis of input data for an accessibility tool, or a good candidate for being the input source of an accessibility tool.

In some embodiments, the method 200 can analyze a nested element by analyzing one or more (e.g., two levels) of ancestors and children. If any ancestor or children element within the analyzed hierarchy have indicia of custom interactivity and are focusable, that element can be a good candidate for selecting as the representative custom interactive element, as the accessibility tools are likely to focus on that element when fetching their input metadata. As a result, a representative custom interactive element, selected in this manner, is a suitable place for test engine 108 to perform accessibility testing.

Figure 3:
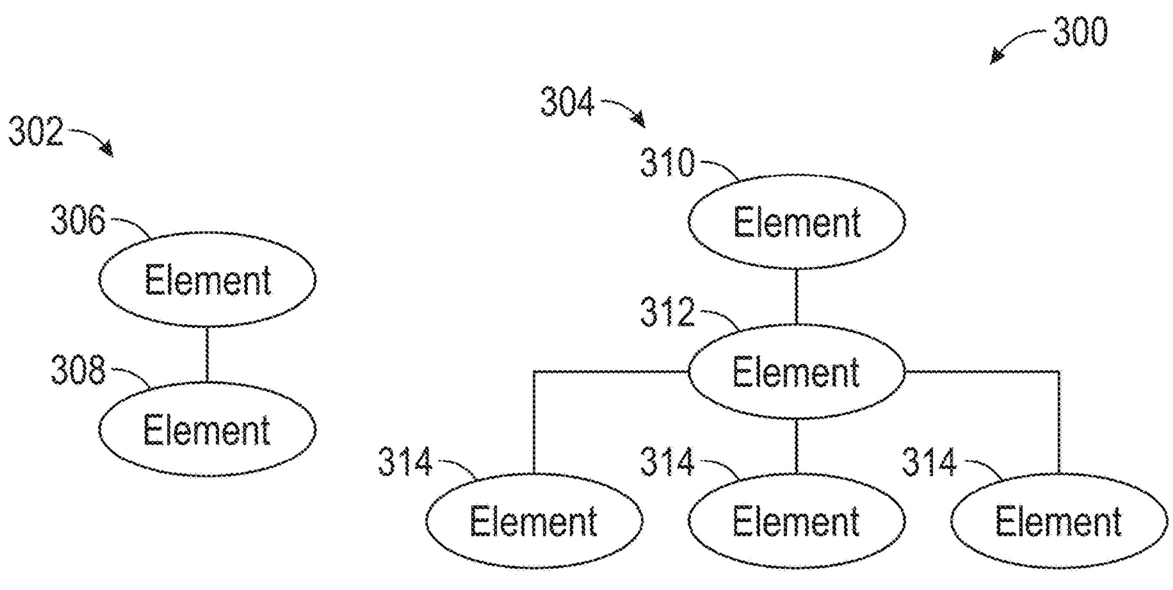
FIG. 3 illustrates a diagram of two example hierarchical elements and selection of a representative custom interactive element.

FIG. 3 illustrates a diagram 300 of two example hierarchical elements and selecting of a representative custom interactive element. The elements in the diagram 300 can include indica of custom user interactivity. Diagram 302 is a scenario of a family tree consisting of a parent element 306 and a child element 308. In this scenario, the representative custom interactive element can be selected to be the outer-most parent, or parent element 306 in this case. Diagram 304 is a scenario of a family tree consisting of a grandparent element 310, a parent element 312, and children elements 314. In this scenario, the representative custom interactive element can be selected to be the inner-most parent, or parent element 312.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 4:
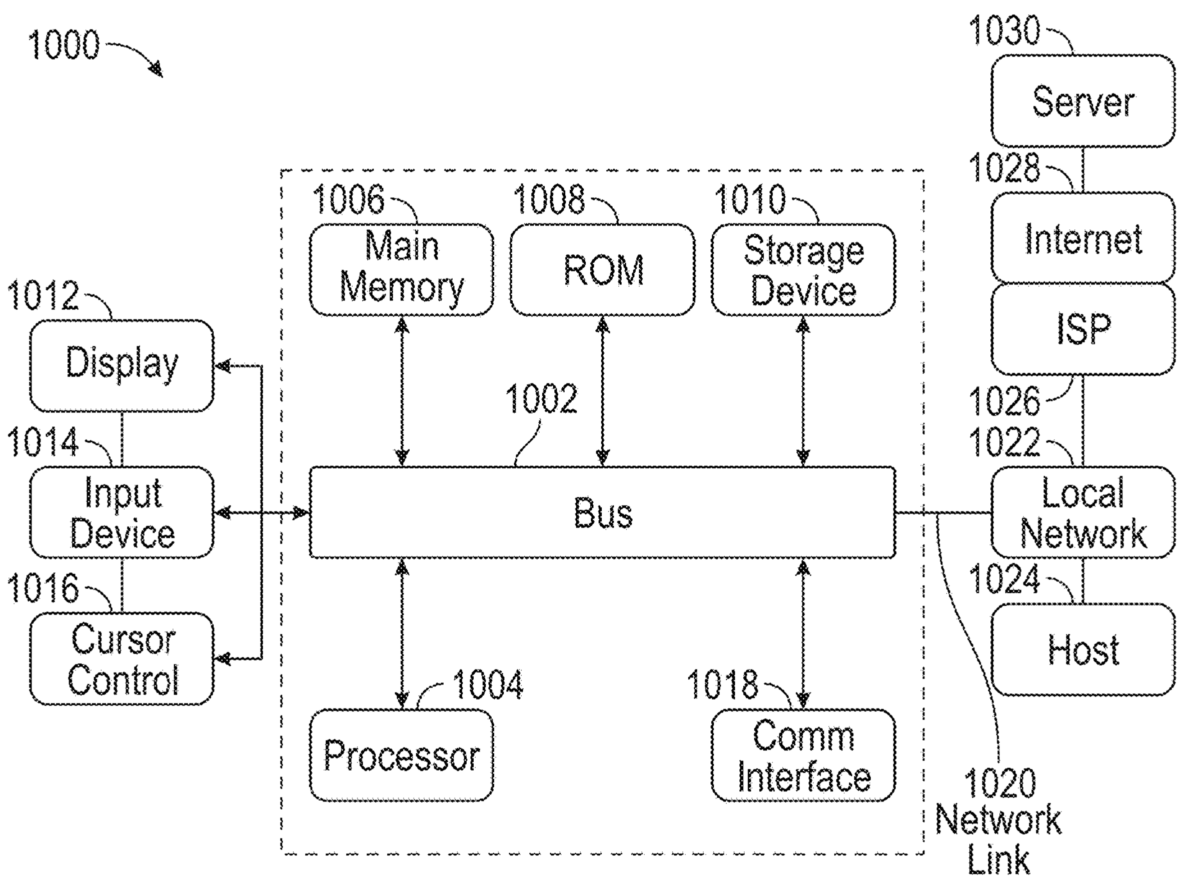
FIG. 4 illustrates an environment in which some embodiments may operate.

For example, FIG. 4 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: receiving an element from the document object model (DOM) of a webpage; determining whether the element contains a number of framework event listeners above a selected threshold; determining whether the element comprises indicia of custom interactivity, the indicia of custom interactivity comprising one or more of the element comprising an event listener with a follow-up logic in response to the event listener detecting an event, and the element comprising a user interface event listener and a user interface modification follow-up logic in response to the user interface event listener; determining whether the element is focusable; and testing compliance of the element with a set of rules, with a test engine.

Example 2: The method of Example 1, further comprising: determining whether the element or a family member of the element in a family tree of the element comprises a standard interactive element.

Example 3: The method of any of Examples 1 and 2, further comprising: determining whether a parent ancestor or a child descendent in a family tree of the element comprises one or more indications of custom user interactivity.

Example 4: The method of any of Examples 1-3, further comprising determining whether a child descendent or parent ancestor in family tree of the element comprises one or more indications of custom user interactivity and is focusable.

Example 5: The method of any of Examples 1-4, further comprising: in an element having a family tree, selecting an outer-most parent as a representative custom interactive element; and testing compliance of the element with the set of rules on the representative custom interactive element.

Example 6: The method of any of Examples 1-5, further comprising: in an element having a family tree, selecting an inner-most parent as a representative custom interactive element; and testing compliance of the element with the set of rules on the representative custom interactive element.

Example 7: The method of any of Examples 1-6, wherein the set of rules comprises accessibility compliance rules, and testing comprises testing for accessibility compliance of the element.

Example 8: A non-transitory computer storage medium that stores executable program instructions that, when executed by one or more computing devices, configure the one or more computing devices to perform operations comprising: receiving an element from the document object model (DOM) of a webpage; determining whether the element contains a number of framework event listeners above a selected threshold; determining whether the element comprises indicia of custom interactivity, the indicia of custom interactivity comprising one or more of the element comprising an event listener with a follow-up logic in response to the event listener detecting an event, and the element comprising a user interface event listener and a user interface modification follow-up logic in response to the user interface event listener; determining whether the element is focusable; and testing compliance of the element with a set of rules, with a test engine.

Example 9: The non-transitory computer storage of Example 8, wherein the operations further comprise: determining whether the element or a family member of the element in a family tree of the element comprises a standard interactive element.

Example 10: The non-transitory computer storage of any of Examples 8 and 9, wherein the operations further comprise: determining whether a parent ancestor or a child descendent in a family tree of the element comprises one or more indications of custom user interactivity.

Example 11: The non-transitory computer storage of any of Examples 8-10, wherein the operations further comprise determining whether a child descendent or parent ancestor in family tree of the element comprises one or more indications of custom user interactivity and is focusable.

Example 12: The non-transitory computer storage of any of Examples 8-11, wherein the operations further comprise: in an element having a family tree, selecting an outer-most parent as a representative custom interactive element; and testing compliance of the element with the set of rules on the representative custom interactive element.

Example 13: The non-transitory computer storage of any of Examples 8-12, wherein the operations further comprise: in an element having a family tree, selecting an inner-most parent as a representative custom interactive element; and testing compliance of the element with the set of rules on the representative custom interactive element.

Example 14: The non-transitory compute storage of any of Examples 8-13, wherein the set of rules comprises accessibility compliance rules, and testing comprises testing for accessibility compliance of the element.

Example 15: A system comprising one or more processors, wherein the one or more processors are configured to perform operations comprising: receiving an element from the document object model (DOM) of a webpage; determining whether the element contains a number of framework event listeners above a selected threshold; determining whether the element comprises indicia of custom interactivity, the indicia of custom interactivity comprising one or more of the element comprising an event listener with a follow-up logic in response to the event listener detecting an event, and the element comprising a user interface event listener and a user interface modification follow-up logic in response to the user interface event listener; determining whether the element is focusable; and testing compliance of the element with a set of rules, with a test engine.

Example 16: The system of Example 15, wherein the operations further comprise: determining whether the element or a family member of the element in a family tree of the element comprises a standard interactive element.

Example 17: The system of any of Examples 15 and 16, wherein the operations further comprise: determining whether a parent ancestor or a child descendent in a family tree of the element comprises one or more indications of custom user interactivity.

Example 18: The system of any of Examples 15-17, wherein the operations further comprise determining whether a child descendent or parent ancestor in family tree of the element comprises one or more indications of custom user interactivity and is focusable.

Example 19: The system of any of Examples 15-18, wherein the operations further comprise: in an element having a family tree, selecting an outer-most parent as a representative custom interactive element; and testing compliance of the element with the set of rules on the representative custom interactive element.

Example 20: The system of any of Examples 15-19, wherein the operations further comprise: in an element having a family tree, selecting an inner-most parent as a representative custom interactive element; and testing compliance of the element with the set of rules on the representative custom interactive element.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method of improving accessibility compliance of a webpage, the method comprising:

receiving a nested user interface element from the document object model (DOM) of a webpage;

determining whether the element contains a number of framework event listeners above a selected threshold, wherein framework event listeners comprise event listeners provided by standard libraries of a programming language used to code the webpage, wherein a large number of event listeners above the selected threshold indicates the element is not a custom interactive element;

determining whether the element comprises indicia of custom interactivity, the indicia of custom interactivity comprising the element having an event listener with an event-listener follow-up logic, wherein the follow-up logic responds to the event listener detecting an event, and the element further comprises a user interface event listener and a user interface modification follow-up logic in response to the user interface event listener, wherein the modification follow-up logic when executed by a browser rendering the webpage performs an action in the user interface element;

determining whether the element is focusable, wherein focusability corresponds to when an interpreter of the browser renders the element, the element responds to keyboard key combinations by visually distinguishing the element;

testing compliance of the element with a set of rules, with a test engine;

generating an accessibility compliance report, based on the testing;

modifying accessibility compliance of the webpage, based at least in part on the accessibility compliance report; and the interpreter of the browser, rendering the webpage with modified accessibility compliance, increasing screen reader compatibility of the webpage.

2. The method of claim 1, further comprising:

determining whether the element or a family member of the element in a family tree of the element comprises a standard interactive element.

3. The method of claim 1, further comprising: determining whether a parent ancestor or a child descendent in a family tree of the element comprises one or more indications of custom user interactivity.

4. The method of claim 1, further comprising determining whether a child descendent or parent ancestor in family tree of the element comprises one or more indications of custom user interactivity and is focusable.

5. The method of claim 1, further comprising:

in an element having a family tree, selecting an outermost parent as a representative custom interactive element; and testing compliance of the element with the set of rules on the representative custom interactive element.

6. The method of claim 1, further comprising:

in an element having a family tree, selecting an innermost parent as a representative custom interactive element; and testing compliance of the element with the set of rules on the representative custom interactive element.

7. The method of claim 1, wherein the set of rules comprises accessibility compliance rules, and testing comprises testing for accessibility compliance of the element.

8. A non-transitory computer storage medium that stores executable program instructions that, when executed by one or more computing devices, configure the one or more computing devices to perform operations directed to improving accessibility compliance of a webpage, the operations comprising:

receiving a nested user interface element from the document object model (DOM) of a webpage;

determining whether the element contains a number of framework event listeners above a selected threshold, wherein framework event listeners comprise event listeners provided by standard libraries of a programming language used to code the webpage, wherein a large number of event listeners above the selected threshold indicates the element is not a custom interactive element;

determining whether the element comprises indicia of custom interactivity, the indicia of custom interactivity comprising the element having an event listener with an event-listener follow-up logic, wherein the follow-up logic responds to the event listener detecting an event, and the element further comprises a user interface event listener and a user interface modification follow-up logic in response to the user interface event listener, wherein the modification follow-up logic when executed by a browser rendering the webpage performs an action in the user interface element;

determining whether the element is focusable, wherein focusability corresponds to when an interpreter of the browser renders the element, the element responds to keyboard key combinations by visually distinguishing the element;

testing compliance of the element with a set of rules, with a test engine;

generating an accessibility compliance report, based on the testing;

modifying accessibility compliance of the webpage, based at least in part on the accessibility compliance report; and the interpreter of the browser, rendering the webpage with modified accessibility compliance, increasing screen reader compatibility of the webpage.

9. The non-transitory computer storage of claim 8, wherein the operations further comprise:

determining whether the element or a family member of the element in a family tree of the element comprises a standard interactive element.

10. The non-transitory computer storage of claim 8, wherein the operations further comprise: determining whether a parent ancestor or a child descendent in a family tree of the element comprises one or more indications of custom user interactivity.

11. The non-transitory computer storage of claim 8, wherein the operations further comprise determining whether a child descendent or parent ancestor in family tree of the element comprises one or more indications of custom user interactivity and is focusable.

12. The non-transitory computer storage of claim 8, wherein the operations further comprise:

in an element having a family tree, selecting an outermost parent as a representative custom interactive element; and testing compliance of the element with the set of rules on the representative custom interactive element.

13. The non-transitory computer storage of claim 8, wherein the operations further comprise:

in an element having a family tree, selecting an innermost parent as a representative custom interactive element; and testing compliance of the element with the set of rules on the representative custom interactive element.

14. The non-transitory compute storage of claim 8, wherein the set of rules comprises accessibility compliance rules, and testing comprises testing for accessibility compliance of the element.

15. A system comprising one or more processors, wherein the one or more processors are configured to perform operations, directed to improving accessibility compliance of a webpage, the operations comprising:

receiving a nested user interface element from the document object model (DOM) of a webpage;

determining whether the element contains a number of framework event listeners above a selected threshold, wherein framework event listeners comprise event listeners provided by standard libraries of a programming language used to code the webpage, wherein a large number of event listeners above the selected threshold indicates the element is not a custom interactive element;

determining whether the element comprises indicia of custom interactivity, the indicia of custom interactivity comprising the element having an event listener with an event-listener follow-up logic, wherein the follow-up logic responds to the event listener detecting an event, and the element further comprises a user interface event listener and a user interface modification follow-up logic in response to the user interface event listener, wherein the modification follow-up logic when executed by a browser rendering the webpage performs an action in the user interface element;

determining whether the element is focusable, wherein focusability corresponds to when an interpreter of the browser renders the element, the element responds to keyboard key combinations by visually distinguishing the element;

testing compliance of the element with a set of rules, with a test engine;

generating an accessibility compliance report, based on the testing;

modifying accessibility compliance of the webpage, based at least in part on the accessibility compliance report; and the interpreter of the browser, rendering the webpage with modified accessibility compliance, increasing screen reader compatibility of the webpage.

16. The system of claim 15, wherein the operations further comprise:

determining whether the element or a family member of the element in a family tree of the element comprises a standard interactive element.

17. The system of claim 15, wherein the operations further comprise: determining whether a parent ancestor or a child descendent in a family tree of the element comprises one or more indications of custom user interactivity.

18. The system of claim 15, wherein the operations further comprise determining whether a child descendent or parent ancestor in family tree of the element comprises one or more indications of custom user interactivity and is focusable.

19. The system of claim 15, wherein the operations further comprise:

in an element having a family tree, selecting an outermost parent as a representative custom interactive element; and testing compliance of the element with the set of rules on the representative custom interactive element.

20. The system of claim 15, wherein the operations further comprise:

in an element having a family tree, selecting an innermost parent as a representative custom interactive element; and testing compliance of the element with the set of rules on the representative custom interactive element.

* * * * *